Feb. 2, 1926. 1,571,349
C. E. SUMMERS
INDICATOR
Filed August 2, 1923  3 Sheets-Sheet 1

Inventor
Caleb E. Summers
By
Francis D. Hardesty
His Attorney

Feb. 2, 1926.  
C. E. SUMMERS  
INDICATOR  
Filed August 2, 1923  
1,571,349  
3 Sheets-Sheet 3
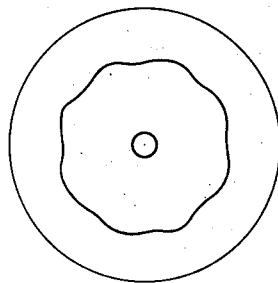
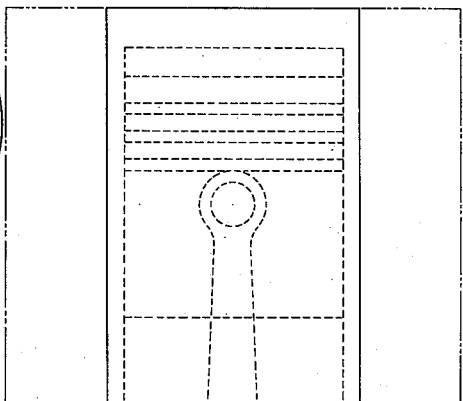
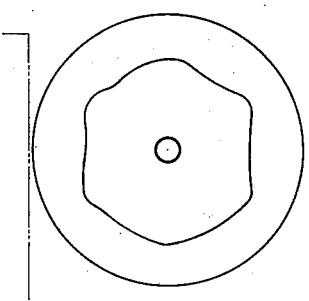
Fig. 6
Fig. 7
Fig. 5
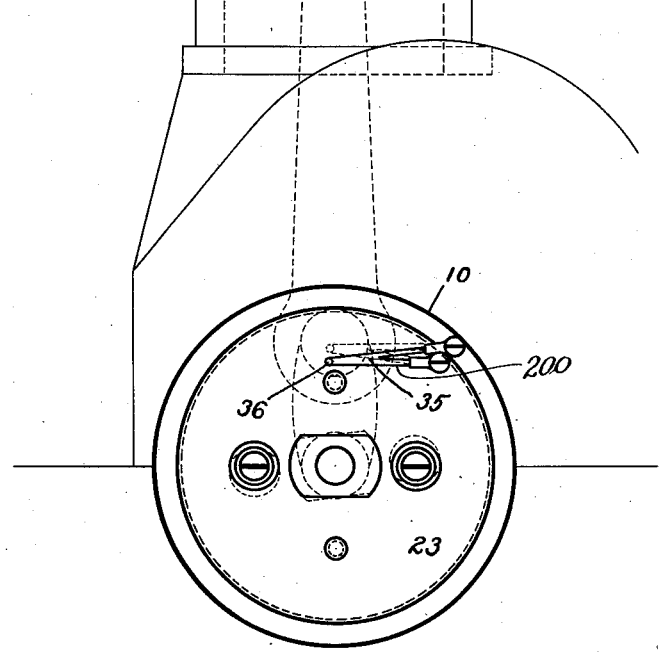
Inventor  
Caleb E. Summers,  
By  
Francis D. Hardesty  
His Attorney Patented Feb. 2, 1926.

1,571,349

UNITED STATES PATENT OFFICE.

CALEB E. SUMMERS, OF DAYTON, OHIO, ASSIGNOR TO GENERAL MOTORS RESEARCH CORPORATION, OF DAYTON, OHIO, A CORPORATION OF DELAWARE.

INDICATOR.

Application filed August 2, 1923. Serial No. 655,379.

*To all whom it may concern:*

Be it known that I, CALEB E. SUMMERS, a citizen of the United States of America, residing at Dayton, county of Montgomery, and State of Ohio, have invented certain new and useful Improvements in Indicators, of which the following is a full, clear, and exact description.

This invention relates to instruments for detecting, measuring and recording torsional vibrations occurring in shafts. It is particularly concerned with means for securing information regarding torsional vibrations in the crankshafts of internal-combustion engines.

As is well known, crankshafts in internal combustion engines often have the characteristic that at certain speeds the torsional vibration set up is very objectionable and injurious, causing undue noises, rattles, etc., to be set up in other portions of the mechanism from sympathetic vibrations and putting undue stresses upon the parts and bearings. These "periods" so-called always occur at the engine speed where the natural period of torsional vibration of the shaft coincides with or is a simple multiple of the number of turning impulses per unit of time exerted upon the shaft. For example, if the natural period of a shaft for a six-cylinder engine is two hundred vibrations per second, a distinct "period" will develop at 1000 R. P. M. engine speed and another at 2000 R. P. M., as at these points the explosion impulses will reinforce the natural vibrations, in the first case, every fourth vibration and, in the second case, every second vibration.

Among the objects of the invention therefore is to enable the study of these torsional vibrations of the crankshaft during engine operation with their elimination or reduction as an end in view.

Another object is to enable the exact determination of the time of occurrence of such vibrations.

Further objects and advantages of the present invention will be apparent from the following description, reference being had to the accompanying drawings, wherein a preferred form of embodiment of the present invention is clearly shown.

In the drawings:

Fig. 5 is an end view of the device as applied to an engine but with the record sheet holder removed.

Figs. 6 and 7 represent typical charts made with the instrument.

In the illustrated embodiment, the instrument forming the subject of this application consists, when used as an indicator, of three main elements, namely, a shaft or arbor 100 carrying a relatively light radiating element 23 rigid therewith, said arbor and element being adapted to partake of all the rotary and vibratory movements of a shaft to be tested; an inertia mass 10 journaled upon said arbor and driven therefrom by elastic driving connections; and an indicator responsive to all vibrations of movement between said arbor and said inertia mass, in such a manner as to give an amplified indication of such variations of movement. When considered as a recording instrument, the said arbor comprises a pilot spindle 20, and the indicator is provided with a marking stylus, so that a record-receiving plate having a central orifice, may be slid over the pilot spindle and have its recording surface brought into contact with the stylus on the recording arm.

Figure 3:
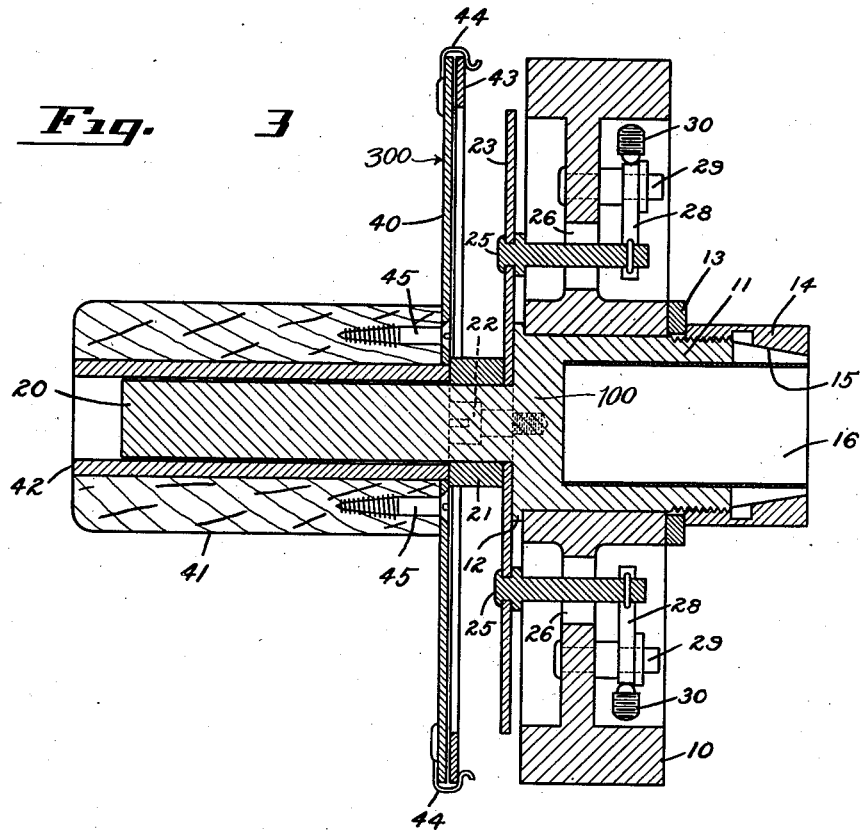
Fig. 3 shows a vertical section on line 3—3 of Fig. 2.

As shown particularly in Fig. 3 of the drawings, the arbor 100 has a portion of an enlarged diameter at one end, upon which is journaled an inertia mass 10. This enlarged portion is hollowed out as at 16, so as to constitute a sleeve 11, the end of said sleeve being split longitudinally and tapered exteriorly as at 15. Adjacent the tapered portion it is exteriorly threaded. A corresponding interiorly-tapered nut 14 engages the threads and the tapered end of the sleeve, thereby forming a split chuck or collet whereby the arbor may be rigidly secured and centered upon the end of a shaft, or of an adapter secured to the shaft.

At 12 there is formed a shoulder adapted to prevent movement of the inertia mass 10, in one direction longitudinally of the sleeve. Movement of the mass 10 in the other direction is prevented by a ring 13, which may be held in place by the nut 14.

Projecting radially from the arbor, there is a relatively light member 23 preferably in the form of a disc, which is rigid with the arbor. Beyond the disc is a stop member 21, also rigid with the arbor and which in the present instance consists of a separate ring-like body held to the enlarged portion of the arbor by screws 22, which also serve to secure disc 23. The stop member 21 preferably has flattened sides, so that the arbor may be held from rotation by engaging the flattened sides of the stop member with a wrench while the nut 14 is being tightened to secure the arbor on the end of a shaft.

Figure 2:
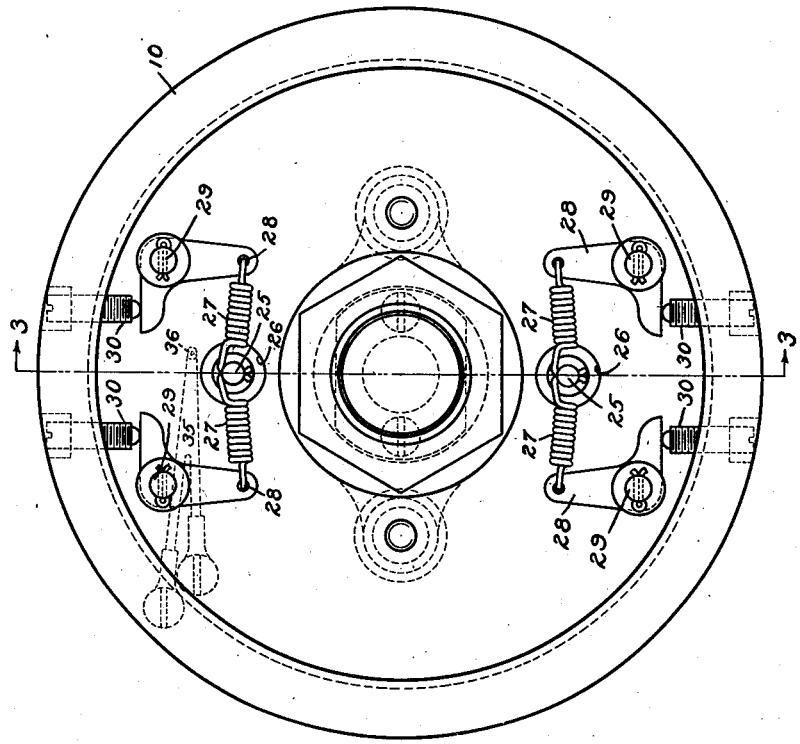
Fig. 2 is an end view of the same toward the left of Fig. 1.

Disc 23 is relatively light and drives member 10 through a resilient drive shown most clearly in Figs. 2 and 3. As shown in Fig. 3 studs 25 are secured in disc 23 and extend through openings 26 in the web of member 10. To the free ends of these studs are attached opposed springs 27 and the latter are secured each to one arm of a bell crank 28 pivotally mounted at 29 upon the web of member 10. The other arms of the cranks 28 bear against adjusting screws 30 for adjusting the tension on springs 27.

Disc 23 being relatively light and secured rigidly to the shaft will respond to the torsional vibrations of the shaft. These vibrations, however, will be absorbed in the resilient drive and will, therefore, not affect member 10. Torsional vibration of the shaft while the latter is rotating will result in small relative movements between member 10 and disc 23. These movements can be detected by the following means.

Disc 23 is somewhat smaller in diameter than member 10 and near its edge carries pivotally mounted thereon one leg of a two-legged lever arm 35 of indicator 200. The other leg is pivotally mounted upon the edge of member 10 and the lever arm normally lies perpendicular to a radius of disc 23 which passes about through the free end of the lever. Any small movement, therefore, of the free end of lever 35 occasioned by relative movement between disc 23 and member 10 will be substantially radial of the disc and, as the lever is much longer than the distance between the two legs, this movement of its free end will be considerably greater than the said relative movement.

Lever 35 carries at its free end a pencil 36 or other stylus or marking device pointing outward from disc 23 for the purpose of recording the movements of the end of said lever.

Figure 1:
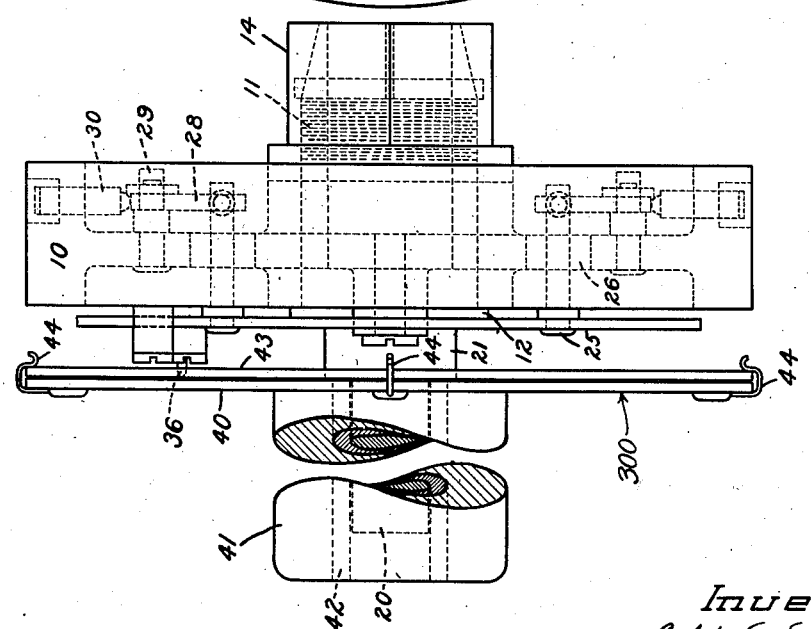
Fig. 1 is a side elevation of the instrument.

Records of the thus amplified movements are taken by means of the record sheet holder 300 shown clearly in Figs. 1 and 3. This record sheet holder consists of a plate or disc 40 with a central opening secured, as by screws 45, upon a tubular handle 41 within which is a metal sleeve 42 adapted to slide freely over the guiding spindle 20 of arbor 100. Spindle 20 acts as a pilot for centralizing disc 40 with respect to disc 23 when records are being taken.

Fitted to the face of disc 40 is a flat ring 43 held in place by clips 44. This ring is for the purpose of holding upon the face of disc 40 suitable circular sheets of paper or the like.

When records are to be taken, the record sheet holder is put in the position indicated in Figs. 1 and 3, resting against stop 21 and the point of stylus or pencil 36 and held against rotation with members 10 and 23. Any torsional vibration of the crankshaft will be marked on the record sheet by a figure approximately polygonal in shape as shown in Figs. 6 and 7.

Figure 4:
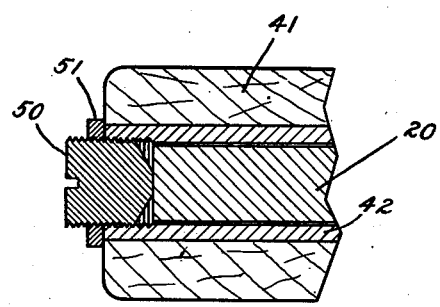
Fig. 4 shows a modification of the record sheet holder in section.

In Fig. 4 is shown a portion of a modified form of record sheet holder. In this form, the spacing member or stop 21 is omitted and disc 23 secured directly against the shouldered part 12 of the arbor. Spacing of the disc 40 from disc 23 is accomplished by a screw stop 50 in the end of sleeve 42, the screw 50 being secured in adjusted position by means of lock nut 51.

By the use of the present device it may be accurately determined at what R. P. M. of the engine the torsional period of the crankshaft has a harmonic relation to the number of power or turning impulses per minute.

While the form of embodiment of the present invention as herein disclosed, constitutes a preferred form, it is to be understood that other forms might be adopted, all coming within the scope of the claims which follow.

What I claim is as follows:

1. In means for indicating torsional vibrations in a shaft or arbor, the combination of an element adapted to be rotated by the shaft in such manner as to partake of all rotary and oscillating movements thereof; an inertia mass mounted to rotate about an axis coincident with a line that includes the axis of rotation of said element; means whereby a steady rotation may be imparted to the inertia mass at the average angular speed of said element; an indicator arm pivoted to said element and to said inertia mass, so that said indicator arm may move in response to relative movements of said element and inertia mass.

2. In means for indicating torsional vibrations in an arbor or shaft, the combination of an element adapted to be rotated by the shaft in such manner as to partake of all rotary and oscillating movements thereof;

an inertia mass mounted to rotate about an axis coincident with a line that includes the axis of rotation of said element; means whereby a steady rotation may be imparted to the inertia mass of the average angular speed of said element; an indicator pivoted to said element and to said inertia mass in such position that the free end of said indicator arm may move in an approximately radial path with respect to the axis of rotation, in response to relative movements of said element and inertia mass.

3. In means for indicating torsional vibrations in a shaft or arbor, a relatively light member partaking of all movements of rotation and oscillation of the shaft; a relatively heavy mass journaled about an axis coincident with a line that includes the axis of said relatively light member; means including a spring for causing said relatively heavy mass to rotate at the average angular speed of said relatively light member; and an indicating arm pivoted to one face of said relatively heavy mass and also pivoted to said relatively light member.

4. In means for indicating torsional vibrations in a shaft; an arbor having at one end means whereby it may be centered with respect to a shaft and secured to the end thereof; a relatively light member secured to said arbor and projecting radially therefrom; an inertia mass journaled on said arbor adjacent said relatively light member; resilient means for driving said inertia mass from said arbor; and an indicator combined with said inertia mass and said relatively light member so as to indicate relative movements thereof.

5. Means such as defined in claim 4, in which the arbor has at one end a collet whereby said arbor may be secured to one end of a shaft to be tested.

6. In means for indicating torsional vibrations in a shaft; an arbor having at one end means whereby it may be centered with respect to and secured to one end of a shaft; an inertia mass journaled upon said arbor; a relatively light member rigid with said shaft adjacent said inertia mass; elastic driving connections between said relatively light member and said inertia mass; and an indicator pivoted to said inertia mass and said relatively light member.

7. In means for indicating torsional vibrations, an arbor; an inertia mass journaled thereon; a relatively light member secured to said arbor, adjacent said mass; a pin projecting from said relatively light member through openings in said inertia mass of such dimensions as to permit angular movements relative to said inertia mass; elastic connecting means between said pin and said inertia mass; and an indicator pivoted to said relatively light member and said inertia mass.

8. Means such as defined in claim 7, in which an adjustable means for varying the tension of the elastic connecting means is mounted on said inertia mass.

9. In means for indicating torsional vibrations, an arbor; an inertia mass journaled thereon; an elastic driving connection between said arbor and inertia mass; a relatively light member rigid with said arbor projecting therefrom adjacent one face of said inertia mass; an indicator arm pivoted to said inertia mass and said relatively light member and projecting in a direction substantially perpendicular to a radial line falling from said arm to the center of rotation of said arbor.

10. In means for indicating and recording torsional vibrations, an arbor; an inertia mass journaled thereon; an elastic driving connection between said arbor and said inertia mass; a relatively light member rigid with said arbor projecting therefrom adjacent one face of said inertia mass; an indicating arm pivoted to said inertia mass and said relatively light member and projecting in a direction substantially perpendicular to a radial line falling from said arm to the center of rotation of said arbor; a recording stylus on said indicator arm and a guiding means adapted to guide a record-receiving device so that its surface may be brought in contact with the stylus.

11. Means such as defined in claim 10, in which the means to guide a record-receiving device consists of a pilot spindle rigid with said arbor and coaxial with respect to it.

12. In means for indicating and recording torsional vibrations, an arbor having a concentric guiding spindle; an inertia mass journaled on the arbor and means for rotating said inertia mass steadily at the average angular speed of the arbor; a relatively light member rigid with said arbor and projecting therefrom adjacent the inertia mass; an indicating arm pivoted to said inertia mass and to said relatively light member and extending in a direction approximately perpendicular to a radial line therefrom to the axis of the arbor; a stylus projecting from said arm in the direction of the guiding spindle; and a record-receiving member comprising a plate having a record-receiving surface adapted to contact with the stylus; and an opening whereby it may be guided by the spindle and be moved toward and away from said stylus.

13. Means such as defined in claim 12, in which the record-receiving plate is attached to a tubular handle.

14. Means such as defined in claim 12, in which a clamping device having an open center, cooperates with the plate to hold a record-receiving sheet in place.

15. Means such as defined in claim 12, in which a stop device limits the approach of the record-receiving plate to correct recording position.

16. In means for indicating and recording torsional vibrations; a record-receiving member comprising a plate having a plane surface and a central orifice; a sleeve secured to said plate in registration with said orifice; a tubular handle portion surrounding said sleeve; and means for retaining a record-receiving sheet upon the plane surface of said plate.

In testimony whereof I hereto affix my signature.

CALEB E. SUMMERS.